United States Patent [19]

Sommer et al.

[11] 4,311,029

[45] Jan. 19, 1982

[54] DATA ENTRY DEVICE FOR A FLATBED KNITTING MACHINE WITH ELECTRONIC CONTROL

[75] Inventors: Werner Sommer, Westhausen; Hans Schieber; Erich Krause, both of Bopfingen; Franz Radel, Westhausen; Werner Trümper, Bopfingen; Henning Rieche, Lauchheim; Dieter Tollkühn, Bopfingen; David Retallick, Gillching; Albin Weingartner, Munich; Peter R. Doslik, Stuttgart, all of Fed. Rep. of Germany

[73] Assignee: Universal Maschinenfabrik Dr. Rudolf Schieber GmbH & Co. KG, Fed. Rep. of Germany

[21] Appl. No.: 120,805

[22] Filed: Feb. 12, 1980

[30] Foreign Application Priority Data

Feb. 12, 1979 [DE] Fed. Rep. of Germany ....... 2905240

[51] Int. Cl.³ .............................................. D04B 7/00
[52] U.S. Cl. ....................................... 66/75.2; 66/231
[58] Field of Search ....................... 66/75, 2, 231, 232; 364/900 MS File

[56] References Cited

U.S. PATENT DOCUMENTS 3,844,139 10/1974 De Cerjat et al. ..................... 66/215
4,114,405 9/1978 Bartels ................................. 66/75.2

FOREIGN PATENT DOCUMENTS 2544696 4/1977 Fed. Rep. of Germany ........ 66/215

*Primary Examiner*—Ronald Feldbaum
*Attorney, Agent, or Firm*—Sughrue, Mion, Zinn, Macpeak and Seas

[57] ABSTRACT

A flatbed knitting machine having electronic control includes memory and control units associated with the machine, a data entry device (11) for the entering of data into the machine, and also indicator means (12, 13), wherein upon the entering of data by way of the data entry device the indicator means provides a guidance report for the user, data called up for entry can be directed to one of several types of machine, each next step in the entry of data can only be effected in accordance with the requirement shown by the indicator means, and at least one key (≠) is provided for stepping-on the indicator means. For extremely simple operation of the data entry device (11) and in order to achieve complete programming of the patterning and of the usual control data for the plan run of the machine, with all the parts necessary for the functioning of the entry device built into the entry device itself, the data entry device (11) has only one keyboard with ten number keys (0 to 9), a decimal point key (.), an erase key (C), a needle selection key (*), a needle selection suppression key (—), a slash key (/), an initial recall key ( ⌐ ), a YES key (=) and a NO key (≠), a digital instruction display (12), and a digital program display (13). For the entry of pattern information five program segments with independent entry possibilities are provided fixedly in the entry device (11), and the data entry device (11) itself includes a permanently connected program for strict user guidance beginning with the choice of the type of machine and of the mode of operation (writing, editing, reading, automonitoring).

14 Claims, 5 Drawing Figures

DATA ENTRY DEVICE FOR A FLATBED KNITTING MACHINE WITH ELECTRONIC CONTROL

BACKGROUND TO THE INVENTION

This invention relates to flatbed knitting machines with electronic control.

The invention is concerned with a flatbed knitting machine having electronic control, memory and control units associated with the machine, a data entry device for the entering of data into the machine, and also an indicator, wherein upon the entering of data by way of the data entry device the indicator provides a guidance report for the user, data called up for entry can be directed to one of several types of machine, each next step in the entry of data can only be effected in accordance with the requirement shown by the indicator, and at least one key is provided for stepping-on the indicator.

One known flatbed knitting machine of this type includes a built-in preprogrammed central data processing unit with battery boost. The pattern programming of this machine is carried out by means of a keying device with digital indicator and with the help of the knitting of sample pieces.

In addition, from German published patent application No. 25 44 696 a data entry device of the type first described above is known which comprises a plurality of keyboards and indicator devices and which can only be operated in combination with separate data processing equipment converting a knitting pattern.

SUMMARY OF THE INVENTION

It is an object of the present invention to provide a data entry device for a flatbed knitting machine of the type first described above, the device being extremely simple in operation, enabling complete programming of the patterning and of the usual control data necessary for the work run of the machine, while determining and displaying all possibilities of the working of the entry device with strict user guidance, and itself incorporating all facilities and switches necessary for its operation with minimum cost.

This is achieved in accordance with the present invention by virtue of the fact that the data entry device has only one keyboard with ten number keys, a decimal point key, an erase key, a needle selection key, a needle selection suppression key, a slash key, an initial recall key, a YES key and a NO key, a digital instruction display, and a digital program display, in which for the entry of pattern information five program segments with independent entry possibilities are provided fixedly in the entry device, in which the data entry device itself includes a permanently connected program for strict user guidance beginning with the choice of the type of machine and of the mode of operation (writing, editing, reading, automonitoring), and in which each time the NO key for the stepping-on of the instruction display is activated it is only effective in respect of the displayed step.

With such a data entry device the user, when the device is switched on, is continuously informed and guided by the indications from the instruction display and from the program display, up until the time when the data entry for a pattern and a knitted piece has been fully completed. The possibilities for error in the data entry procedure are reduced to a minimum and the entry of the data can even be accomplished by unskilled personnel.

The keys which are provided are sufficient for the complete entry of data; the YES key enables the user to make a decision after a word with a question mark and to confirm or acknowledge the character shown in the instruction display; the NO key serves as a roll key for calling up different modes of operation and program segments and for aborting; the needle selection key enables choice of the needles to be selected; the key for needle selection suppression serves to indicate the needles which are not chosen; the slash key provides a slash character for the division or separation of a plurality of function numbers entered in succession; and the initial recall key enables one to fade in the beginning of a line in the instruction display in order to find the connection with the further programming.

In one embodiment of the invention, an external storage medium can be connected to the data entry device for recording and transmitting the entire program, the storage medium preferably being a magnetic tape device. By this means it is possible to carry out the program entry not only into the store which is internal to the machine, but also to record the complete program on an external store, for example a magnetic tape cassette, simultaneously with the entry into the internal machine store, and also to transfer from this external store to the machine store.

In one particular embodiment of flatbed knitting machine in accordance with the invention the data entry device is built into the machine as a fixed unit and is assembled with the machine controls. In this case it is preferable if in addition to the entry device which is built into the machine there is also provided a second similar data entry device. This additional data entry device can be connected independently of the flatbed knitting machine to the external storage medium in order to record the complete program independently of the internal memory of the flatbed knitting machine. The recorded program can then later be played back as often as is required to the internal machine store upon connection of the external storage medium to the data entry device which is built into the machine.

The five program segments for the user-guided pattern entry preferably comprise program segments for course segments of a pattern draft or pattern chart for the knitting pattern, for the needle set-up, for the knitting plan, for a function number schedule and for the plan run. The complete programming according to suitably prepared program sheets is made possible by these program segments.

In the data entry device decision option points are preferably provided between individual entry steps. These option points can be made known in the instruction display by a symbol, for example a question mark. At these option points different possibilities are indicated in the instruction display; by actuating the NO key the device steps on, and by actuating the YES key the instruction can be confirmed.

The number entries made via the entry device are preferably able to be changed as often as one wishes, with the number state being indicated in the instruction display and being confirmable by the YES key, whereafter the subsequent number appears automatically.

Furthermore, to attract the attention of the user and for the indication of operator faults a special display character is preferably also provided, for example an exclamation mark.

One preferred embodiment of data entry device in accordance with the invention is one in which the continuation of the entry procedure is blocked if primary necessary conditions, such as the plugging in of the magnetic tape unit, have not been fulfilled.

Furthermore, the order of data subgroups in the program segments is preferably fixedly preset in the entry device and the instruction display indicates which numbers are required at any given time. Supplementary to this, it is also advantageous to provide the facility to abort from any program segment after the entry of a data subgroup. One can then carry out a new programming of the data subgroup or transfer to a different program segment.

The data entry device of the present invention is preferably so constructed that the particular program which is being run is continuously indicated in the program display and is identifiable by a four-position display. The user, during the data entry procedure, then always has an optical record of the program segment in which he is working.

BRIEF DESCRIPTION OF THE DRAWINGS

In order that the invention may be fully understood certain embodiments in accordance therewith will now be described by way of example and with reference to the accompanying drawings. In the drawings.

DESCRIPTION OF THE PREFERRED EMBODIMENT

Figure 1:
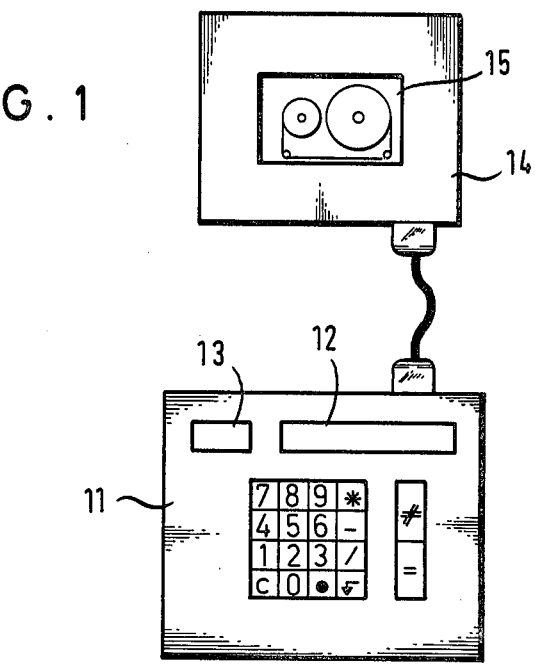
FIG. 1 is a schematic illustration of a data entry device having a magnetic tape device connected to it as an external storage medium.

FIG. 1 is a plan view of a data entry device 11 in the form of a console. The entry device includes a number of keys arranged in a block. These consist of ten number keys 0 to 9, a decimal point key ., an erase or cancel key C, and four function keys comprising a key * for needle selection, a key — for needle selection inhibit, a slash key / for use as a separating or dividing symbol during the entry of a number of function numbers, and a start recall key ↑ for fading in the beginning of a line in the instruction display in order to find the connection to the further programming. Two further function keys are provided on the entry device, separate from the other keys, and consisting of a YES key = and a NO key ≠. The entry device also includes a twelve-position digital instruction display 12 and a four-position digital program display 13.

A magnetic tape device 14 with an insertable magnetic cassette 15 can be connected to the data entry device 11. This gives one the possibility, during the input of data with the entry device 11 into the flatbed knitting machine (not shown), simultaneously to store this data on the magnetic tape cassette 15, or alternatively to feed only the magnetic tape cassette 15 with the entered data. The data can on the other hand be replayed directly into the knitting machine from the magnetic tape cassette 15 with the help of the magnetic tape device 14 which is connected to the entry device 11. If the data entry device 11 is constructed as a unit which is separate from the knitting machine, then there arises as a consequence the possibility of preparing the machine operating data independently of, i.e. remote from, the flatbed knitting machine and of subsequently replaying the data into the machine.

Figure 2:
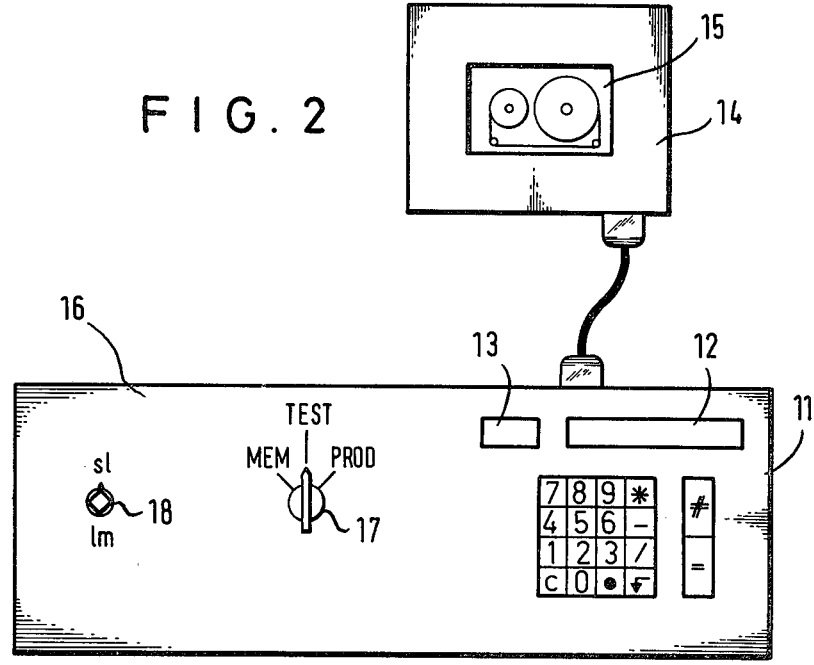
FIG. 2 is a schematic illustration similar to that shown in FIG. 1, but showing a data entry device assembled integrally with the machine controls, and suitable to be built into a flatbed knitting machine.

FIG. 2 shows a data entry console 11 which is likewise detachably connected to a magnetic tape device 15. Here, the data entry device 11 is assembled integrally with the machine controls 16 and is built-in with these controls into the flatbed knitting machine. The machine controls 16 comprise a switch 17 for switching on the data entry device and for the control of storage (MEM), testing (TEST) and production (PROD). A second switch 18 is also provided which enables one to switch between rapid operation (sl) and slow operation (lm). The double arrow between the data entry device 11 and the magnetic tape device 14 is intended to indicate that a flow of data between the two devices is possible in either direction depending upon the particular chosen mode of operation of the devices.

The data entry device 11 serves to effect direct entry of pattern programs and control programs into the fully automatic flatbed knitting machine and also for the making of pattern carriers, i.e. pattern records, in the form of magnetic tape cassettes 15 using the magnetic tape unit 14. The data entry device 11 is designed to be attractive to use and is preprogrammed for its tasks. It operates according to a question/answer system. The predetermination of the entry runs and entry values in the sense of providing strict guidance for the user means that in the use of the device errors are automatically avoided to a substantial extent.

Any data entry is immediately capable of being monitored by way of the twelve-position instruction display 12. In the case of a data entry which is of a length in excess of the twelve available positions, the display will step further to the left so that the character group most recently entered will always be displayed visibly at the right-hand end of the display.

If wrong values are entered, immediate editing, i.e. correction, is possible. When an entry error is only discovered later, after the entry of further data, delayed correction of the wrongly entered data is still possible in a simple manner.

Plan sheets A, B and C which are clear and organised in an easily understandable way and which enable a rapid and reliable entry of the data serve as original masters for the pattern-based data entry.

Figure 3:
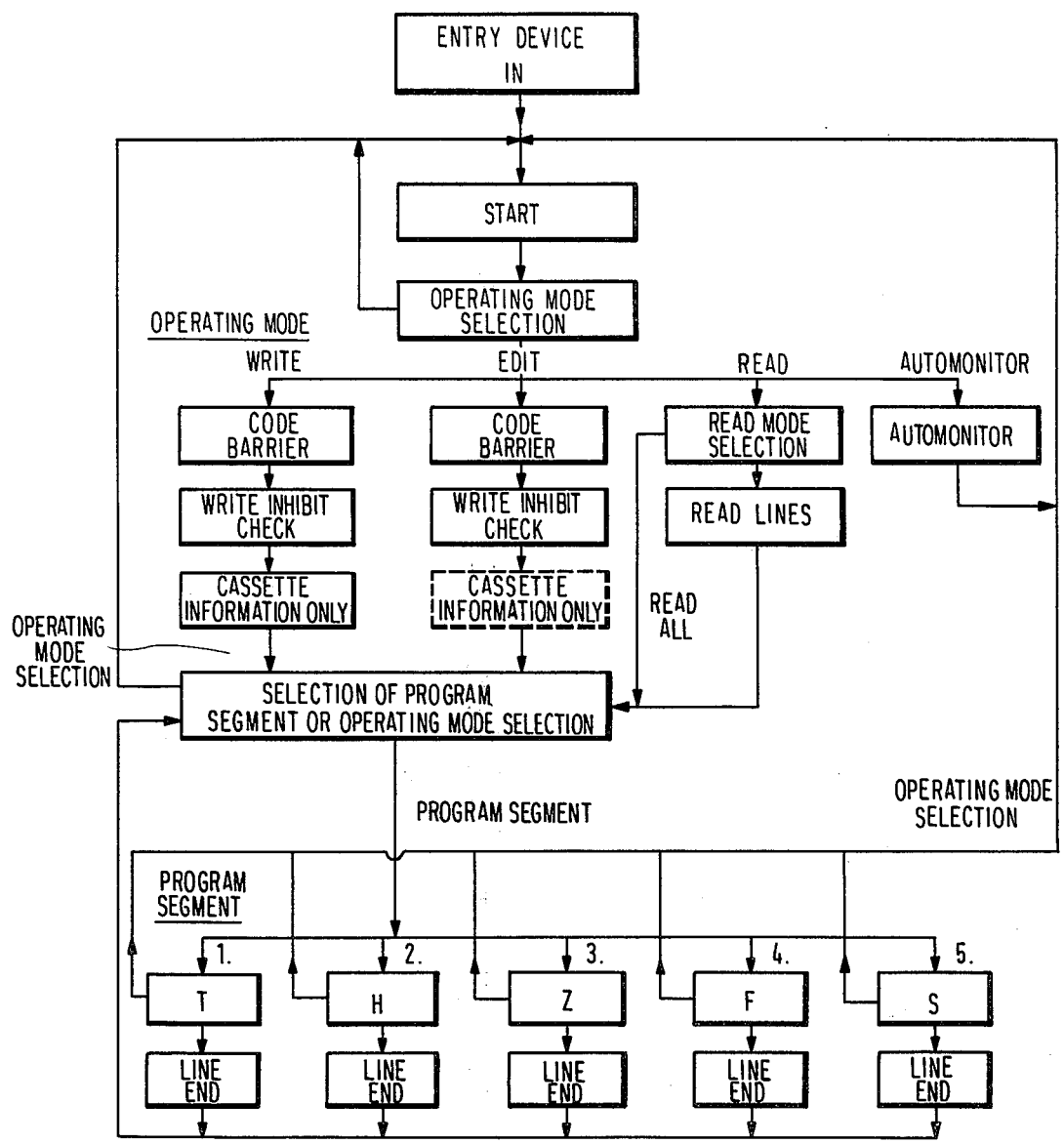
FIG. 3 is a block operational diagram of a data entry device according to the present invention; and, FIGS. 4a and 4b are a block operational diagram of a control device for the control of the machine and having a built-in data entry device.

A block schematic operational diagram of the data entry device is shown in FIG. 3. The data entry device 11, in combination with the magnetic tape unit 14 and additionally with a printer (not shown), can be installed as an independent unit. After the data entry device has been switched on and started, a choice of the mode of operation has then to be made. Depending upon the combination of devices, the following modes of operation are possible:

(a) the writing of a magnetic tape with data
(b) reading the data from a magnetic tape
(c) editing the data on a magnetic tape
(d) automonitoring print of the data on a magnetic tape at high speed.

In the operating modes (a) to (c) a printer can likewise be connected up to the apparatus, in which case the automonitoring print will occur in the working cycle.

After the selection of the mode of operation, write entries and edit entries in either mode each have to surmount a barrier in the form of a code number in order to prevent unintended writing or editing. It is then necessary to test the writing inhibit or block in these two modes of operation and then to check and enter the characteristic cassette tape information. The characteristic cassette tape information includes the type of the knitting machine, the gauge of the machine and the plan number of the pattern. Thereafter, one program segment from five fixed wired program segments has to be chosen or replaced in order to carry out the chosen mode of operation.

In the reading mode of operation there is the possibility of choosing the type of reading, in other words to choose either a precision (line) readout or a readout of the whole contents. Thereafter it is again necessary to choose a program segment or another mode of operation.

The choice of the automonitoring mode of operation finally leads directly to the automonitoring printout and after the ending of the automonitoring printout a return to a renewed choice of mode of operation.

The five program segments for the user-guided pattern input consist of a program segment T for the course segments of a pattern draft or pattern chart of the knitting pattern, a program segment N for the needle set-up, a program segment Z for the knitting plan, a program segment F for a functions number schedule, and a program segment S for the plan run. All five program segments, after a line termination, lead back to the selection of another program segment or another mode of operation.

All data which are not supplied by way of the data carrier of the machine can be entered into the machine directly and can be changed at any time. Included among such data is for example the stipulation of the number of pieces to be knitted or the length and width limitations.

Between the individual entry steps decision points are provided which are made recognisable in the instruction display 12 by the symbol ?. At these decision points different possibilities are indicated in the instruction display. By pressing the NO key ≠ the possibility is ignored and the program moves on, while by pressing the YES key = the indicated possibility is confirmed.

The numbers entered via the entry device 11 can be changed as often as one likes; the particular number state appears in the instruction display 12 and is confirmable by the YES key =, whereafter the next number appears automatically.

To attract the attention of the user and for the indication of operator faults a special character ! is provided. The continuation of the entry procedure is also blocked if certain mandatory limit conditions are not fulfilled, such as the plugging in of the magnetic tape unit 14.

The serial sequence of data subgroups of the program segments T, N, Z, F and S is rigidly predetermined in the data entry device 11. In the instruction display 12 there is an indication of which numbers are required in each case. An abort facility from each program segment is provided for after the entry of any particular data group.

Furthermore, the particular program is continuously identifiable in the four-position program display 13.

In connection with the YES key = it is to be understood that this key enables the user to make a decision after the appearance of a word followed by a question mark. If, as mentioned above, certain mandatory limit conditions, such as for example that the magnetic tape unit has not been connected, are not fulfilled, the operation of the YES key = will register as an operator fault, this will be indicated in the instruction display 12, and in addition to this the visual indication can be reinforced by the giving of an audible signal.

Finally, it is to be understood that in each job step only certain keys of the keys on the data entry device 11 are functionally effective, i.e. active.

The possible operating runs for the data entry device 11 are set out in chart-like form in the Appendix I, Sheets 1 to 20. The supervisory program display continuously gives information about the chosen type of program. The individual action steps appear in the instruction display.

The meanings of the terms in the form sheets in Appendix I are as follows:

Job step: Job title for a particular programmed process.

Job master: The necessary form (plan sheet A, B or C) with data for the job step.

Active keys: The keys which correspond to the relevant job step. All keys not explicitly referred to are "dead" and will produce no reaction.

Continuation display: Statement as to which job step originates in the display appearing in position 1.

Operating procedure: For each job step the work run to be executed is preprogrammed in the entry device. The position number indicates the order in which the instruction display changes.

Possible operator faults: Possible faults in the handling of the device as well as in typing are notified in the instruction display, possibly accompanied by an audible signal. The rapid correction of faults is possible by means of the feedback which is provided in this way.

Abort: The possibility for intended "termination" or "interruption" of a job step.

Figure 4A:
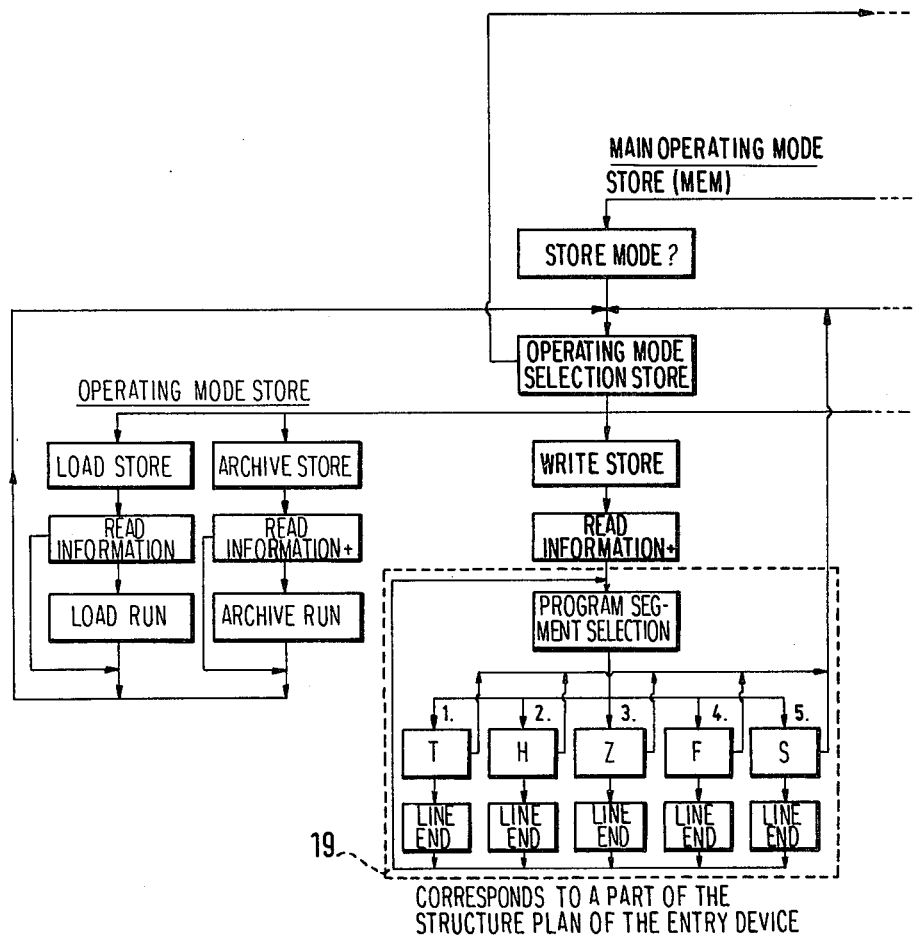
Figure 4B:
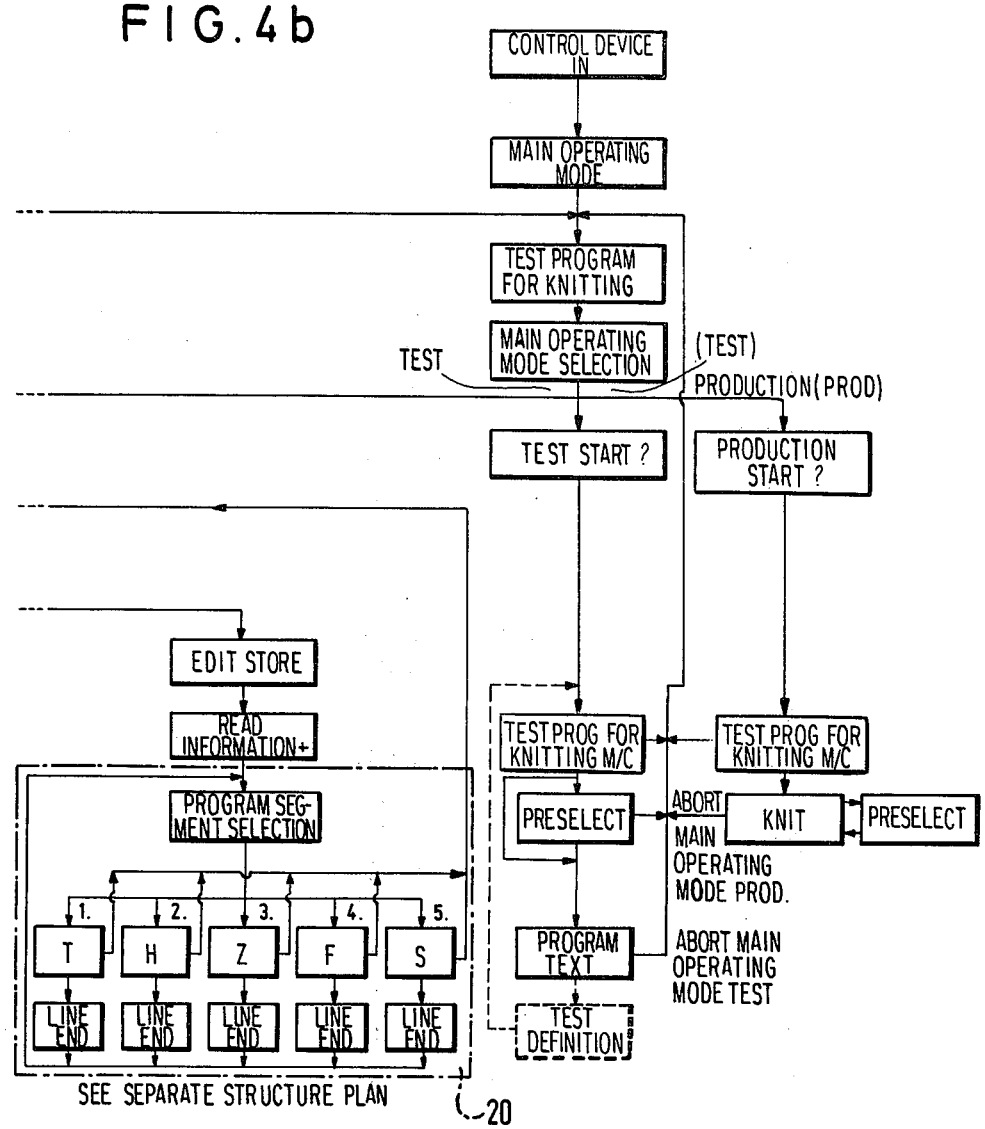

FIGS. 4a and 4b shows a diagrammatic operational chart for a control device in which the data entry and machine controls are combined. The portion 19 of the structure plan corresponds to a part of the structure plan of the data entry device 11. Moreover, a similar additional structure plan portion 20 is provided. The complete control device also includes the possibility of carrying out test programs as well as initiating a production run. The choice of the main mode of operation is effected by means of the switch 17 (FIG. 2). The rest of the structure diagram of FIG. 4a and 4b will be understood from consideration of the foregoing description of the data entry device 11 and its structure diagram.

The provision of the paper-based program information in the form of the aforementioned plan sheets A, B and C for the pattern can be arranged in the following way:

so that the data is ordered into the different inbuilt primary groups, namely pattern draft, functions number schedule, needle set-up, knitting plan and plan run;

-continued so that each of these data groups consists of individual data subgroups which are similarly inbuilt and self-contained;

so that the data subgroups include different family names consisting of one or more letters;

so that the data groups distinguish a primary group by the number following the family name (family name and number are regarded as indentification);

so that the data subgroup of the pattern draft (course segments) has the structure:

| Family name 1 with number | any sequence of knitting information (in symbolic writing or as numbers) |
|---|---|
| Identification for course segment | |

(Example: T17*-*--- etc. where * is the symbol for select and - is the symbol for do-not-select);

so that the data subgroup of the functions number schedule (course function) has the structure:

| Family name 2 with number | any sequence of separated characters as symbols or number and function number |
|---|---|
| Identification for course functions | |

(Example: F1/17/24/29);

so that the data subgroup for the needle set-up has the structure (fixed length):

| Family name 3 with number | Letters(s) with number |
|---|---|
| 1 | 2 |
| + (or −) number | Letter(s) with number |
| 3 | 4 | where:
1  identification of the needle set-up
2  wale number in the pattern draft
3  number of wales to the right (+) or to the left (−)
4  number of traverses, e.g. W2: number of traverses programmed by the selector switch 2, e.g. D3: fixed programmed number of traverses (3 times)

(Example:  N30X51 − 20W3
   or   N15X92 + 2 D1);

so that the subgroup of the knitting plan (plan line) has the following structure, depending upon machine type (fixed length):

(a) <u>Machine without Jacquard selection</u>

| Family name 4 with number | Family name 2 with number |
|---|---|
| Plan line | Course functions |

(Example: Z1F13);

<u>2-system machine with Jacquard selection from one needle bed</u>
(Individual needle selection with two cams)

| Family name 4 with number | Family name 2 with number |
|---|---|
| 1 | 2 |
| Letter(s) with number | Letter(s) with number |
| 3 | 4 | where:
1  plan line
2  course functions
3  course segment for the front left cam
4  course segment for the front right cam (Example: Z1F12 VLG 3 VRU 3).

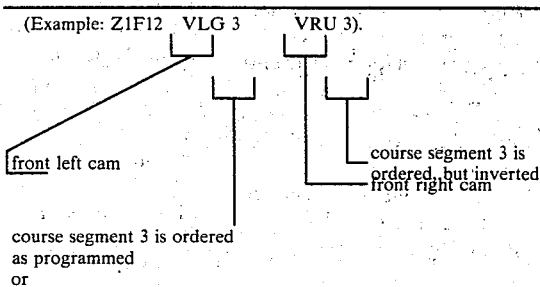

front left cam course segment 3 is ordered, but inverted front right cam course segment 3 is ordered
as programmed
or (b) 2-system machine with Jacquard selection from both needle beds
(Individual needle selection with 4 cams)

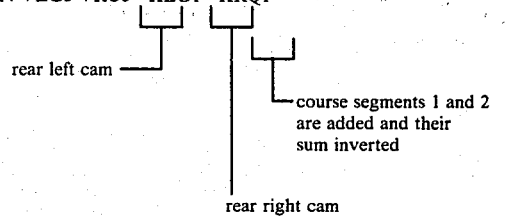

where:
1. Plan line
2. Course functions
3. Course segment for front left cam
4. Course segment for front right cam
5. Course segment for rear left cam
6. Course segment for rear right cam Example:  Z1F14 VLG3 VRU3  HLG1  HRQ1 rear left cam course segments 1 and 2
are added and their
sum inverted rear right cam so that the subgroup of the plan run (serial number)
has the structure (fixed length):

| Family name 5 with number | Family name 4 with number |
|---|---|
| serial number of the plan run (cycle) | From plan line ... |
| + (or −) with number | Letter(s) (2 possibilities) with number |
| to ... plan line counting up (+) to ... plan line counting down (−) | Number of traverses, e.g. W2: number of traverses programmed by the selector switch 2, e.g. D3: fixed programmed number of traverses (3 times) |

(Example:  S2 Z 13 − 5W2
    or    S8 Z 25 + 15D3)
and so that the family names with number are freely
ordered.

We claim:
1. In a knitting machine having electronic control, memory and control units associated with the machine, a data entry device for the entering of data into the machine, and also indicator means, wherein upon the entering of data by way of the data entry device the indicator means provides a guidance report for the user, data called up for entry can be directed to one of several types of machine, each next step in the entry of data can only be effected in accordance with the requirement shown by the indicator means, and at least one key is provided for stepping-on the indicator means, the improvement wherein the data entry device has only one keyboard with ten number keys, a decimal point key, an erase key, a needle selection key, a needle selection suppression key, a slash key, an initial recall key, a YES key and a NO key, a digital instruction display, and a digital program display, in which for the entry of pattern information five program segments with independent entry possibilities are provided fixedly in the entry device, in which the data entry device itself includes a permanently connected program for strict user guidance beginning with the choice of the type of machine and of the mode of operation (writing, editing, reading, automonitoring), and in which each time the NO key for the stepping-on of the instruction display is activated it is only effective in respect of the displayed step.

2. The improvement according to claim 1, further comprising an external storage medium means connected to the data entry device for recording and transmitting the entire program.

3. The improvement according to claim 2, in which the storage medium is a magnetic tape device.

4. A flatbed knitting machine according to claim 1, in which the data entry device is built into the machine as a fixed unit and is assembled with the machine controls.

5. The improvement according to claim 4, in which in addition to the entry device which is built into the machine there is also provided a second said data entry device connected to said external storage medium means.

6. The improvement according to claim 1, in which the five program segments for the user-guided pattern entry comprise program segments for (a) the course segments of a pattern draft for the knitting pattern, for (b) the needle set-up, for (c) the knitting plan, for (d) a function number schedule and for (e) the plan run.

7. The improvement according to claim 1, in which decision option points are provided between individual entry steps, and these option points are made known by a symbol in the instruction display.

8. The improvement according to claim 7, in which at the option points different possibilities are indicated in the instruction display, whereupon by actuating the NO key the entry device steps on, or by actuating the YES key the instruction is confirmed.

9. The improvement according to claim 1, in which number entries made via the entry device are able to be changed as often as desired, with the number state being indicated in the instruction display and being confirmable by the YES key, whereafter the subsequent number appears automatically.

10. The improvement according to claim 1, in which to attract the attention of the user and for the indication of operator faults a special display character is provided.

11. The improvement according to claim 1, in which the continuation of the entry procedure is blocked if primary necessary conditions, such as the plugging in of a magnetic tape unit, have not been fulfilled.

12. The improvement according to claim 1, in which the order of data subgroups in the program segments is fixedly preset in the entry device and the instruction display indicates which numbers are required at any given time.

13. The improvement according to claim 12, which includes the facility to abort from any program segment after the entry of a data subgroup.

14. The improvement according to claim 1, in which the particular program which is being run is continuously indicated in the program display where it is identifiable by a four-position display.

* * * * *